United States Patent [19]
Azeem

[11] Patent Number: 5,878,472
[45] Date of Patent: Mar. 9, 1999

[54] METHOD FOR LIFTING TRACKS ON TRACK-AND-WHEEL SYSTEMS

[75] Inventor: Amr Abdel Azeem, Killeen, Tex.

[73] Assignee: Makeen Tool Corporation, Killeen, Tex.

[21] Appl. No.: 634,152

[22] Filed: Feb. 16, 1996

Related U.S. Application Data

[62] Division of Ser. No. 259,040, Jun. 13, 1994, abandoned.

[51] Int. Cl.$^6$ ........................................... B23P 6/00
[52] U.S. Cl. ..................... 29/402.08; 29/426.3; 29/426.5
[58] Field of Search ............................ 29/402.03, 402.08, 29/426.5, 426.6, 239, 267, 281.5, 283, 426.1, 426.3; 81/125.1; 254/25, 131, 94; 180/9.1; 248/351

[56] References Cited

PUBLICATIONS

Department of the Army Organizational Maintenance Manual for Hull, Powerpack, Drive Controls, Tracks, Suspension and Associated Components.
Department of the Army Operators PMCS Armored Combat Earthmover.

*Primary Examiner*—Joseph M. Gorski
*Attorney, Agent, or Firm*—Locke Purnell Rain Harrell, P.C.

[57] ABSTRACT

A tool for and method to facilitate the replacement of wheels on track-and-wheel vehicles and equipment by lifting the track from the road-wheels in a quick, safe and efficient manner. A tool with an elongated section and two forked ends, each fork having a long prong and a short prong, the long prongs of both ends not being on the same side of the tool. In operation, one forked end is placed in notches in the lower track, and the other forked end is placed in notches in the upper track. The vehicle is then driven in a direction so that the tool acts as a wedge lifting the upper track off of the road wheel.

4 Claims, 5 Drawing Sheets

METHOD FOR LIFTING TRACKS ON TRACK-AND-WHEEL SYSTEMS

REFERENCE TO PRIOR APPLICATION

This application is a divisional of the prior filed U.S. application Ser. No. 08/259,040 filed Jun. 13, 1994, now abandoned, for A TOOL AND METHOD FOR LIFTING TRACKS ON TRACK-AND-WHEEL SYSTEMS.

FIELD OF THE INVENTION

This invention relates to lifting tracks and/or wheels on vehicular track-and-wheel systems to facilitate the removal and replacement of failed or damaged wheels.

BACKGROUND

The present invention has particular utility with track-and-wheel driven vehicles used for general civil engineering or general military purposes. When a wheel fails or is damaged, it must be replaced. Currently, lifts are used to lift the wheel off of the ground and lower track. The upper track is lifted off of the top of the wheel using a chain that is attached to a manual winch which is hung over any suitable edge or corner that can be found on the vehicle above the track-and-wheel system.

Under ideal weather conditions on dry pavement, the old process requires three to four people, and approximately 45 minutes to one hour, on average, to complete. In unfavorable weather conditions and on more difficult terrain, the old process could require 5 persons and 3 to 5 hours. The number of personnel and time required using the old systems and methods are a tremendous disadvantage. This is especially true where time and personnel are critical, such as in battle or wartime conditions where loss of equipment and time delays cost lives.

Even under ideal conditions, the current method is not safe. The winch is simply hooked over any available corner and the risk of slippage of the chain or the winch is high. Additionally, the personnel must manually operate the equipment. Consequently, at least one person is placed at risk of potentially severe personal injury using the old method.

The present tool and method has tremendous advantages over the old systems and methods. First of all, the present invention performs the same task as the old methods in approximately 15 minutes and only requires two persons. The tool also costs less to manufacture, weighs less, can be stored and used more easily, does not require that the personnel be near the equipment during the lifting operation and has a greatly reduced potential for slippage.

SUMMARY OF THE INVENTION

A tool for and a method to facilitate the replacement of wheels on track-and-wheel vehicles and equipment by lifting the track from the road-wheels in a quick, safe and efficient manner. A tool having an elongated section, two forked ends each having a long prong and a short prong, where the long prongs of both ends are on opposite sides of the tool. To use the tool, one forked end is placed in notches in the lower track; the other forked end is placed in notches in the upper track and the vehicle is driven in a direction so that the tool acts as a wedge lifting the upper track off of the top of the road wheel.

DESCRIPTION OF THE PREFERRED EMBODIMENT

Figure 1:
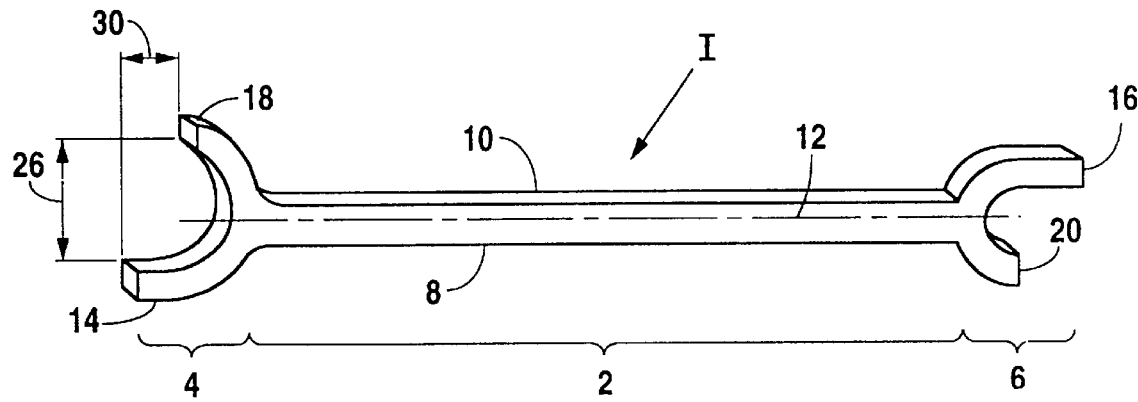
FIG. 1 is an illustration of a track-lifting tool.

The tool 1 shown in FIG. 1 is comprised of an elongated section 2 and two end sections 4 and 6. When positioned in an upright position as illustrated, the Tool 1 has two opposing sides 8 and 10 relative to an axis 12.

Figure 3:
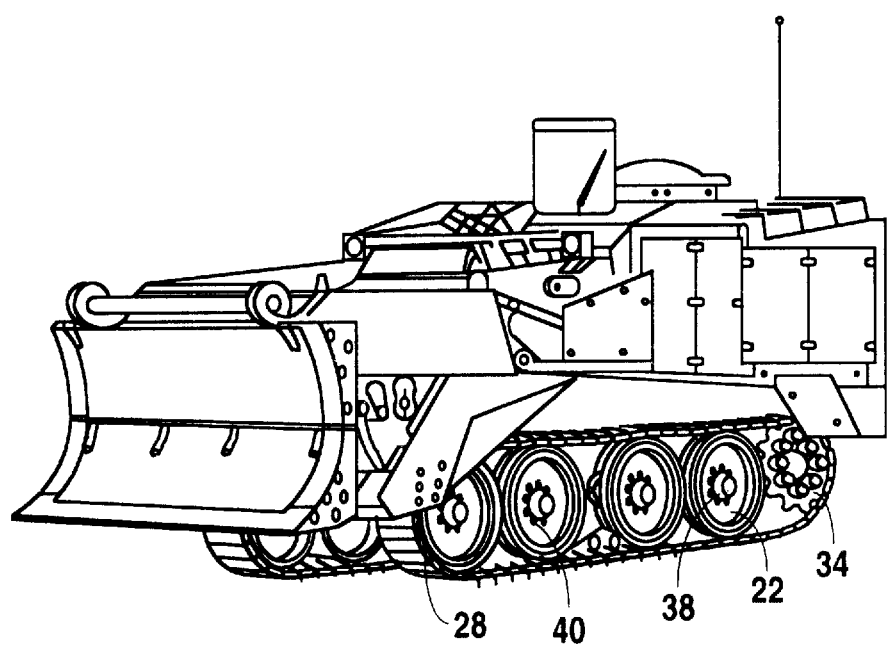
FIG. 3 is an illustration of an earth-moving vehicle with a track-and-wheel system.

An embodiment of the Tool 1 shown in FIG. 1, is of particular utility for track-and-wheel systems such as those found on military tanks and similar military and commercial vehicles shown in FIG. 3.

For a track-and-wheel system, the Tool 1 can be used to lift and separate the track 24 from the top of the wheel 22. For this purpose, the end sections 4 and 6 are forked, with each fork having two prongs of unequal length 14, 16, 18 and 20. Each end 4 and 6 has a long prong 14 and 16 and a relatively shorter prong 18 and 20. The long prong 14, on one end 4, is on the opposite side 8 of the long prong 16, of the other end 6.

The dimensions of Tool 1 are determined by the equipment on which the tool is intended to be used. For example, the earth mover shown in FIG. 3 has a road-wheel 22 and track 24 drive system. The size and weight of the wheels and tracks for different track-and-wheel systems vary widely depending on the vehicle or equipment on which the system is used. For this reason, the actual dimensions of components of the invention vary with the variety of sizes and weights in track-and-wheel system equipment and vehicles.

The dimensions of the elongated section 2 of the tool are determined by the diameter of the road-wheel 22, and the load which the tool must bear during the lift motion described below. The greater the diameter of the road-wheel 22, the longer and thicker the elongated section 2 must be. The heavier the load, the thicker the elongated section 2 must be.

The dimensions of the forked ends 4 and 6 are determined by the track, the load, and the diameter of the road-wheel. The spacing 26 between the long and short prongs 14 & 18 and 16 & 20, on either end, 4 or 6 respectively, of Tool 1 is determined by the shape of the linking elements 28 of the track 24 shown in FIG. 4. The difference in the length 30 of the prongs 14 & 18 and 16 & 20 on either end of Tool 1 is determined by the diameter of the road-wheel and the shape of the linking elements 28 of the track 26 in FIG. 4. The shape of the prongs 14 and 18 is determined by the shape of the sprocket guide-holes or notches 32 in the track 26 shown in FIG. 4. Sprockets 34 which drive the track are shown in FIG. 3.

Using this information, a reasonably skilled tool-maker can calculate and determine the proper materials and dimensions of the tool for a particular track-and-wheel system.

For a M9 (ACE) track-and-wheel earth moving vehicle, for example, suitable dimensions for the tool are: Prong width of long prong length of approximately 2 inches, short prong length of 1 inch, prong thickness of approximately ¾ inches, prong spacing of approximately 4.4 inches, and with an elongated section made of approximately 1½ inch pipe with wall thickness of approximately ¼ inches of sufficient length so that the overall length of the tool will be approximately 48 inches.

METHOD OF OPERATION

Figure 4A:
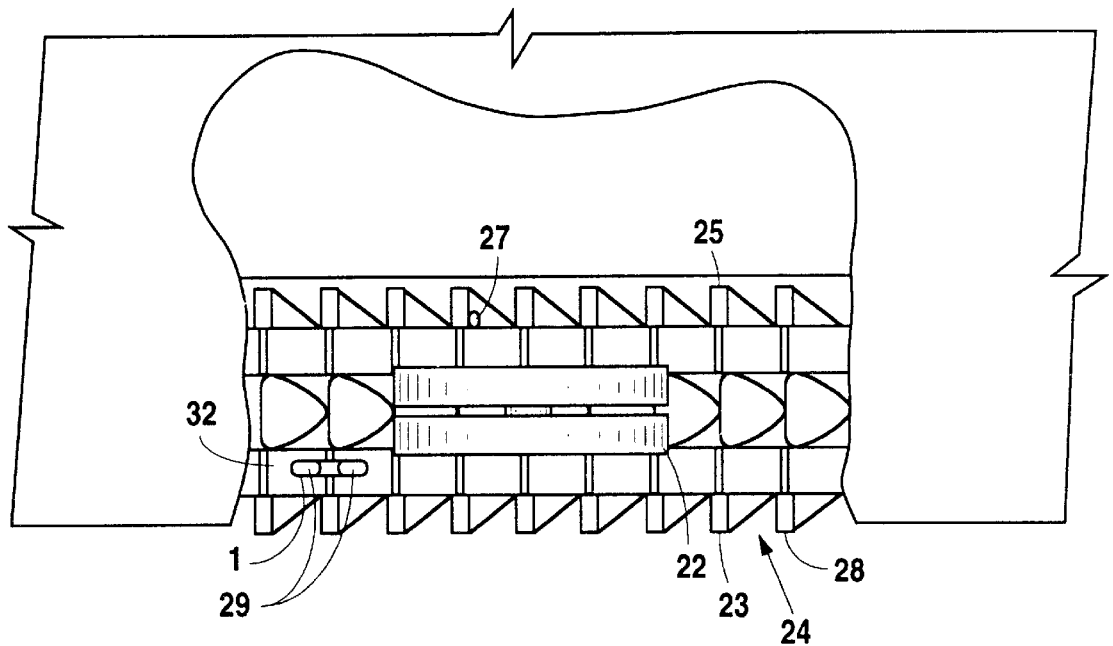
FIG. 4a is an illustration of a section of track as viewed from the top down with the top track removed showing a position on the track where the lower prongs can be placed in the sprocket guide-hole notches in the outer track and the position where the road wheel lift is placed.
Figure 4B:
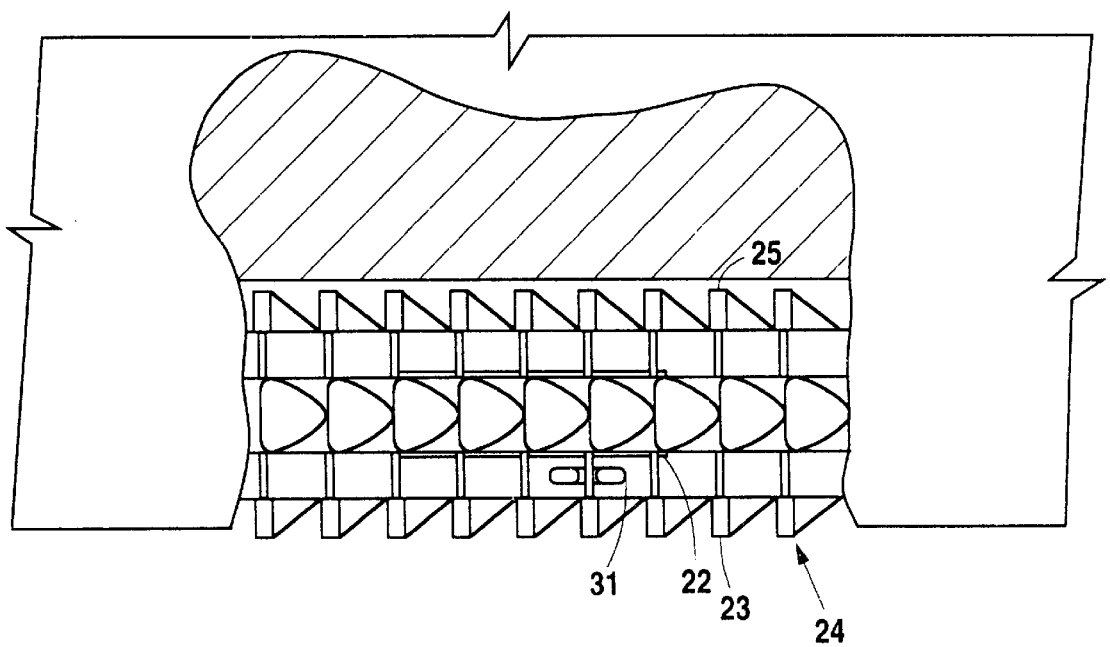
FIG. 4b is an illustration of a section of the track as viewed from the top showing the position where the top prongs of the tool can be placed to prepare for the lifting operation.
Figure 5A:
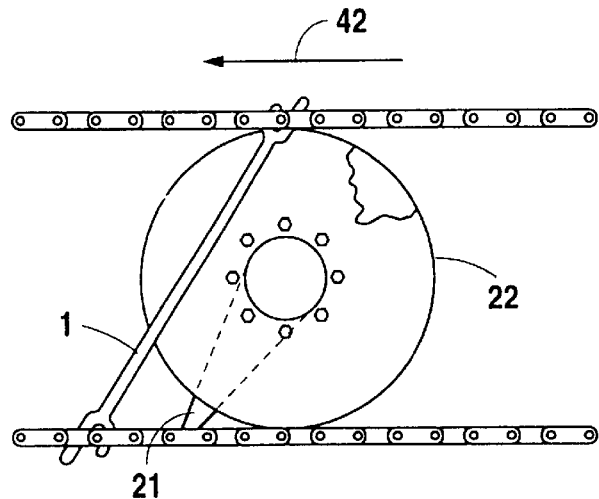
FIG. 5a is an illustration of the proper placement of the tool on the track-and-wheel system.
Figure 5B:
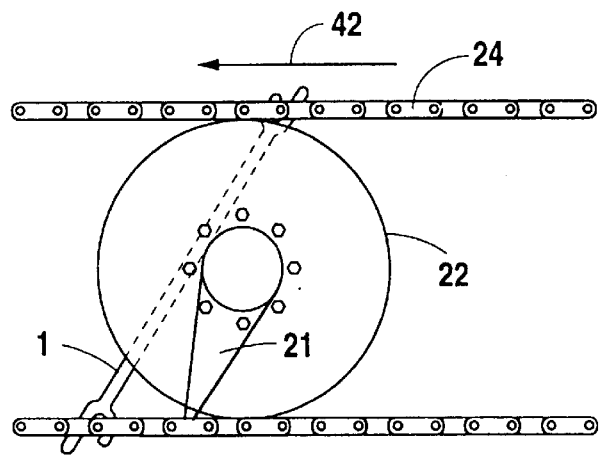
FIG. 5b is an illustration of how the tool is placed on the track-and-wheel system from the perspective of the vehicle looking out.
Figure 6:
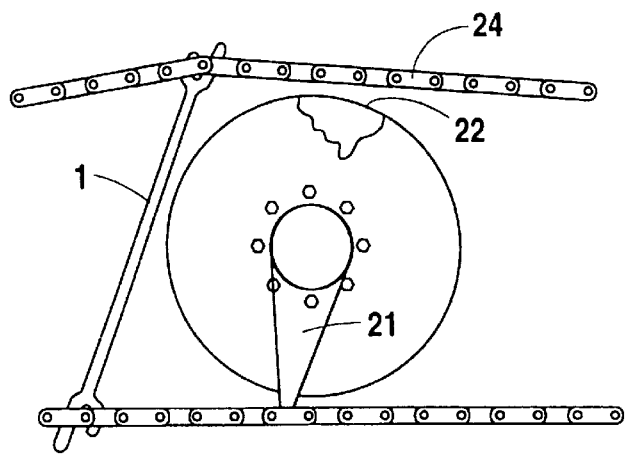
FIG. 6 is an illustration of a track-and-wheel system lifted by the tool from the perspective of the vehicle looking out.
Figure 7:
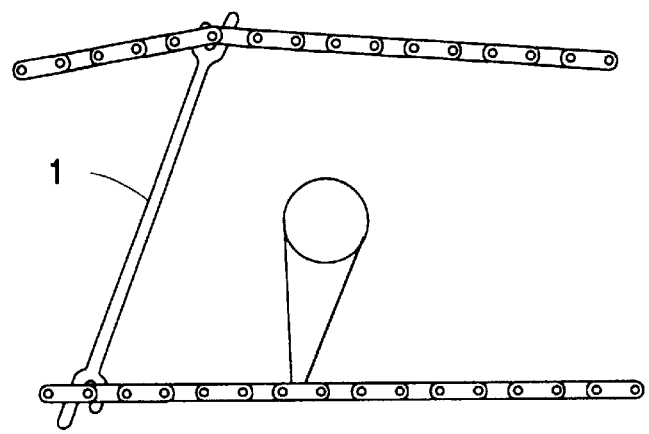
FIG. 7 is an illustration of a lifted track and wheel hub with the damaged wheel removed.
Figure 8:
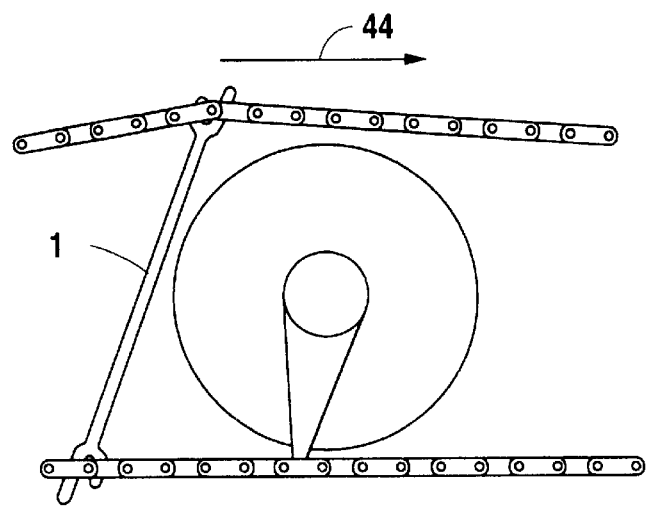
FIG. 8 is an illustration of a lifted track and replaced wheel.
Figure 9:
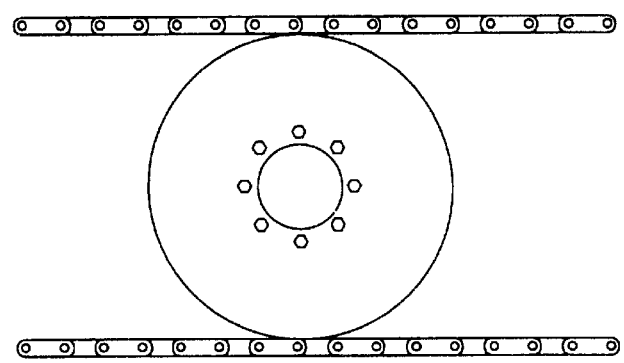
FIG. 9 is an illustration of a repaired track-and-wheel system ready for operation.

Operation of the Tool is illustrated in FIGS. 5a & 5b, 6, 7, 8 and 9. After it has been determined that a road-wheel must be removed from a track-and-wheel system, the operator should:

1. loosen lug-nuts on the road-wheel;

2. on the outside of the track 23, place the long prong 14 of one end 4 of the Tool 1 in a notch in the track near the top of the wheel 22 in position 31 as shown in FIGS. 5a and 4b;

3. place the long prong 16 of the other end 6 of the Tool 1 in a notch in a position 29 at a different vertical position to the left or right on the track below the wheel 22 as shown in FIGS. 5a and 4a;

4. place the bottom of the wheel lift 21 near position 27 on the inside or vehicle side 25 of the track 24 so that it has an angular orientation similar to the orientation of Tool 1 on the outside of the track as shown in FIG. 4a and in FIG. 5b [If a vertical lift is used, place the lift directly below the hub after the track is raised in step 5.];

5. drive the vehicle slowly in direction 42 shown in FIGS. 5a and 5b until the track-and-wheel are lifted and Tool 1 is in position to allow removal of the damaged road-wheel as shown in FIG. 6;

6. place the vehicle in "neutral" or "park" and, using stops, blocks and/or brakes for safety;

7. install the road-wheels on the hub as shown in FIG. 8;

8. drive the vehicle slowly in direction 44 shown in FIG. 8 opposite the direction shown in FIGS. 5a and 5b. Positions 27 and 29 are intended to illustrate that the positions are both to one side of the center of the wheels. The actual positions can both be either to the left or the right along the path of the track. Additionally the amount to the right or left depends on the dimensions of the wheel and track and the heights to which the wheel and track are to be raised.

ALTERNATIVE EMBODIMENTS

Figure 2A:
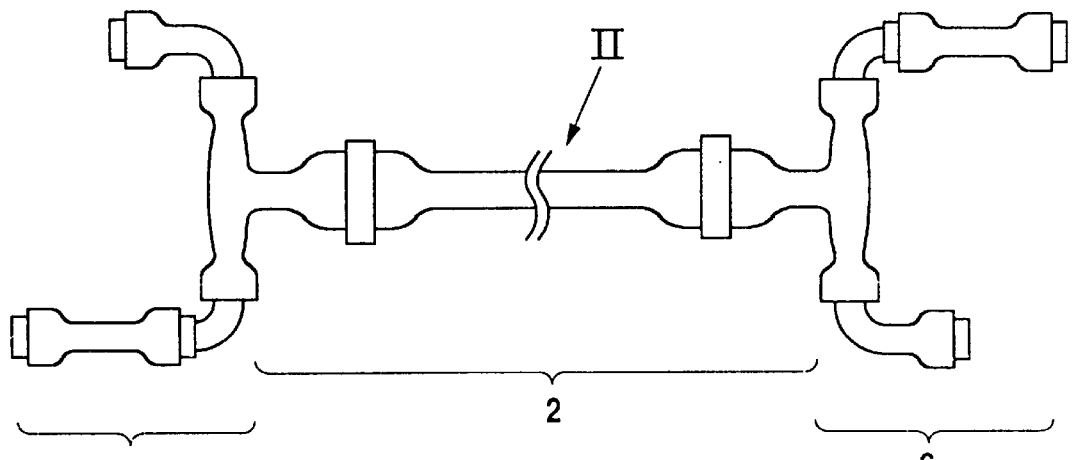
FIG. 2a is an illustration of an alternative construction of the invention.

The elongated component, and/or the forked-end component of the invention can be made of circular pipes, or other shaped material, and fittings to improve the absorption of the load imposed on the components during lifting. FIG. 2a illustrates the Tool 11 constructed of pipe.

Figure 2B:
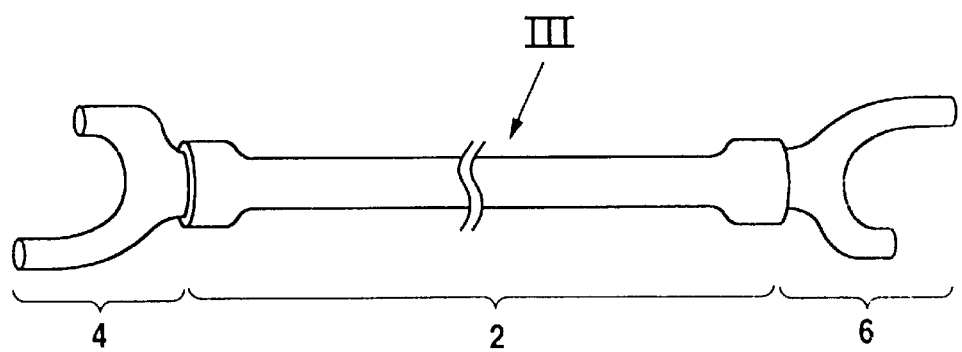
FIG. 2b is an illustration of another alternative embodiment.

In another alternative embodiment shown in FIG. 2b, the elongated section of Tool 111 is comprised of pipe with both ends threaded and the functional ends are formed pieces which are threaded to mate with the elongated section.

Currently, track-and-wheel vehicles are equipped with a "cheater pipe" which is used as a lever arm to loosen the lug-nuts of the wheels as described in step 1 of the method described above. Another advantage of the embodiments shown in FIGS. 2a and 2b is that they can also replace the "cheater pipe" by disassembling the elongated section from the functional ends and using it as the "cheater pipe."

Using this information, a reasonably skilled tool-maker can calculate and determine the proper materials and dimensions of the tool for a particular track-and-wheel system.

The disclosure and description of the Invention, provided above and in the drawings, are illustrative and explanatory thereof, and variations in the size, shape and materials as well as details of the illustrated construction are possible without departing from the spirit of the invention.

We claim:

1. A method of disengaging a track from a wheel in a track-and-wheel drive system, comprising the steps of:

providing a track-and-wheel drive system having wheels surrounded by an endless track such that a top portion of said track engages a top surface of said wheels and a bottom portion of said track engages a bottom surface of said wheels, wherein each of said wheels has a diameter, and wherein said endless track includes alternating linking elements and guide holes;

providing a tool having a main body with two ends defining a length therebetween, and a set of two prongs extending from each of said ends, wherein one prong of each set is longer than the other prong of said set, wherein said one prong and said other prong define a space therebetween, and wherein said length of said main body is greater than said diameter of said wheels;

inserting the longer prong of each set into one of said guide holes in each of said top portion and bottom portion of said endless track, respectively, thereby positioning said main body non-vertically relative to said top and bottom portions; and operating said drive system such that said wheels rotate and said top portion of said endless track moves in a first linear direction while said bottom portion of said endless track moves in a second linear direction that is opposite to said first linear direction, thereby rotating said tool towards a vertical position such that the shorter prong of each said set is received within another of said guide holes in each of said top and bottom portions of said endless track, respectively, and a linking element of each of said top and bottom portions is received within said space defined between said longer and shorter prongs of each said set, respectively, whereby said top and bottom portions of said endless track move away from one another such that said top portion of said endless track becomes disengaged from the top surface of one of said wheels and said bottom portion of said endless track becomes disengaged from the bottom surface of said one of said wheels.

2. A method of disengaging a track from a first wheel and re-engaging the track with a replacement wheel in a track-and-wheel drive system, comprising the steps of:

providing a track-and-wheel drive system having wheels surrounded by an endless track such that a top portion of said track engages a top surface of a first wheel and a bottom portion of said track engages a bottom surface of said first wheel, wherein each of said wheels has a diameter, and wherein said endless track includes alternating linking elements and guide holes;

providing a tool having a main body with two ends defining a length therebetween, and a set of two prongs extending from each of said ends, wherein one prong of each set is longer than the other prong of said set, wherein said one prong and said other prong define a space therebetween, and wherein said length of said main body is greater than said diameter of said wheels;

inserting the longer prong of each set into one of said guide holes in each of said top portion and bottom portion of said endless track, respectively, thereby positioning said main body non-vertically relative to said top and bottom portions;

operating said drive system such that said wheels rotate and said top portion of said endless track moves in a first linear direction while said bottom portion of said endless track moves in a second linear direction that is opposite to said first linear direction, thereby rotating said tool towards a vertical position such that the shorter prong of each said set is received within another of said guide holes in each of said top and bottom portions of said endless track, respectively, and a linking element of each of said top and bottom portions is received within said space defined between said longer and shorter prongs of each said set, respectively, whereby said top and bottom portions of said endless track move away from one another such that said top portion of said endless track becomes disengaged from the top surface of said first wheel and said bottom portion of said endless track becomes disengaged from the bottom surface of said first wheel;

removing said first wheel from a corresponding hub in said track-and-wheel drive system;

securing a replacement wheel to said hub; and operating said drive system such that said wheels rotate and said top portion and said bottom portion of said endless track each moves in a reverse linear direction, thereby rotating said tool towards a non-vertical position such that the shorter prong of each said set disengages said guide holes in each of said top and bottom portions of said endless track, and the longer prong of each said set is removed from its respective guide hole in each of said top portion and bottom portion of said endless track, thereby engaging said top portion of said endless track with the top surface of said replacement wheel and engaging said bottom portion of said endless track with the bottom surface of said replacement wheel.

3. The method of claim 2, wherein the longer prongs of each set are on opposite sides of an elongated axis of the main body.

4. A method of disengaging a track from a first wheel and reengaging the track with a replacement wheel in a track-and-wheel drive system, comprising the steps of:

a) providing a vehicle having a track-and-wheel drive system having wheels mounted on an axle via a plurality of lug-nuts, said wheels surrounded by an endless track such that a top portion of said track engages a top surface of a first wheel and a bottom portion of said track engages a bottom surface of said first wheel, wherein each of said wheels has a diameter, and wherein said endless track includes alternating linking elements and guide holes;

b) providing a tool having a main body with two ends defining a length therebetween, and a set of two prongs extending from each of said ends, wherein one prong of each set is longer than the other prong of said set, wherein said one prong and said other prong define a space therebetween, and wherein said length of said main body is greater than said diameter of said wheels;

c) loosening said lug-nuts securing said first wheel to said axle;

d) inserting the longer prong of each set into one of said guide holes in each of said top portion and bottom portion of said endless track, respectively, thereby positioning said main body non-vertically relative to said top and bottom portions;

e) positioning a wheel lift near said first wheel and between said axle and said bottom portion of said track so that said lift has an angular orientation similar to the orientation of the tool;

f) operating said drive system such that said wheels rotate and said top portion of said endless track moves in a first linear direction while said bottom portion of said endless track moves in a second linear direction that is opposite to said first linear direction, thereby rotating said tool and said lift towards a vertical position such that said lift raises and supports said first wheel, and such that the shorter prong of each said set is received within another of said guide holes in each of said top and bottom portions of said endless track, respectively, and a linking element of each of said top and bottom portions is received within said space defined between said longer and shorter prongs of each said set, respectively, whereby said top and bottom portions of said endless track move away from one another such that said top portion of said endless track becomes disengaged from the top surface of said first wheel and said bottom portion of said endless track becomes disengaged from the bottom surface of said first wheel;

g) securing said vehicle in place;

h) removing said first wheel from said axle;

i) securing a replacement wheel to said axle;

j) operating said drive system such that said wheels rotate and said top portion and said bottom portion of said endless track each moves in a reverse linear direction, thereby rotating said tool and said lift towards a non-vertical position such that the shorter prong of each said set disengages said guide holes in each of said top and bottom portions of said endless track, and the longer prong of each said set is removed from its respective guide hole in each of said top portion and bottom portion of said endless track, thereby engaging said top portion of said endless track with the top surface of said replacement wheel and engaging said bottom portion of said endless track with the bottom surface of said replacement wheel; and k) removing said tool and said lift from said track-and-wheel drive system.

\* \* \* \* \*

UNITED STATES PATENT AND TRADEMARK OFFICE
CERTIFICATE OF CORRECTION

PATENT NO. : 5,878,472
DATED : March 9, 1999
INVENTOR(S) : Abdel-Azeem, Amr A.

It is certified that error appears in the above-identified patent and that said Letters Patent is hereby corrected as shown below:

On the title page, item [75] Inventors:

Substitute "Abdel Azeem" with --Abdel-Azeem--.

Signed and Sealed this

Eighteenth Day of January, 2000

Attest:

Q. TODD DICKINSON

*Attesting Officer*      *Commissioner of Patents and Trademarks*